May 28, 1940.  M. R. FERRIS  2,202,519
FISH LURE
Filed Feb. 3, 1939
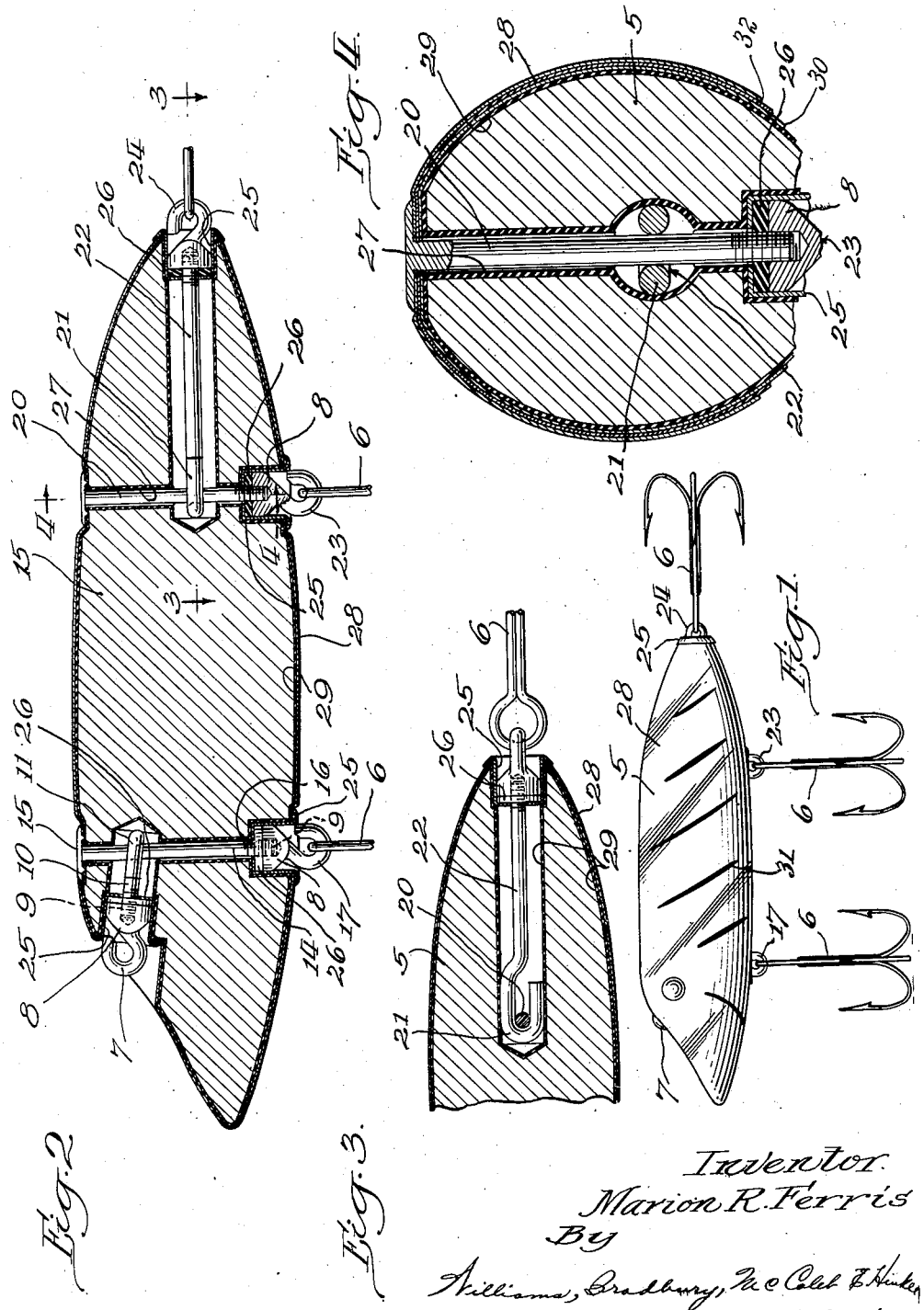
Inventor.
Marion R. Ferris
By
Williams, Bradbury, McCaleb & Hinkle
Attys.

Patented May 28, 1940

2,202,519

UNITED STATES PATENT OFFICE 2,202,519

FISH LURE

Marion R. Ferris, La Grange, Ill.

Application February 3, 1939, Serial No. 254,339

7 Claims. (Cl. 43—46)

This invention relates to improvements in fish lures and more particularly to the treatment of the wooden bodies of fish lures such that the paint or enamel covering will not be cracked or checked by expansion or contraction of the wooden body due either to temperature changes or moisture absorption.

It is a common experience with wooden fish lures that the enamel or exterior coating becomes cracked, allowing water to soak into the wood, thus changing the weight of the lure and consequently its action as it drawn through the water. The cracking of the enamel is caused primarily by sudden temperature changes. The fisherman allows the lure to lie in the sun or in a tackle box upon which the sun is beating until the lure becomes heated either unevenly or throughout. While it is in this heated condition in which the enamel is stretched because of the expansion of the wood, the lure is thrown into the cold water which instantly chills and contracts the enamel, frequently causing it to crack under the strain. Cracking due to this cause is more frequent when the lure has been allowed to lie exposed to the sun so that one side is heated more intensely than the other. The contraction which takes place when the lure is plunged into the water throws very uneven strains upon the enamel.

An object of my invention is to overcome the difficulties heretofore encountered from such causes.

Another object is to provide a light-absorbing luminous bait which can be subjected to very sudden heat changes without its enamel becoming broken or cracked.

A further object of my invention is to provide attachment means for the hooks and drag eyes of baits which will be extremely strong and durable and which will not permit water to be drawn into the interior of the wood by the depression caused by contraction of the air within the wood body.

The invention which I have thus briefly described is illustrated in the accompanying drawing in which:

Figure 1 is an elevation of a conventional form of wooden fish lure with three prong hooks applied;

Figure 2 is a section through a lure, through the openings in which have been passed an efficient type of hook and drag eye connecting devices of my invention;

Figure 3 is a section through a portion of Figure 1 showing the means by which the drag eye and the tail hook eye are attached to prevent their being pulled out of the lure body under strain; and Figure 4 is a section through the body and particularly through the coatings showing the rubber and enamel coatings.

More specifically, the body portion 5 is preferably made of soft light wood of a character which will float upon the surface of water notwithstanding the weight of the metal parts by which the hooks 6 and drag eye 7 are attached. The drag eye 7, like the eyes which support the hooks 6, is formed with a body portion 8 threaded at 9 to receive a rod or wire 10, the inner end of which is formed into a loop at 11 like that shown in plan in Figure 3. A rod or pin 14 having a toothed head 15 passes through the loop 11 and has an end threaded at 16 onto which an eye member 17 having a body portion similar to 8 is threaded. A similar pin 20 passes through the loop 21 of the tail hook pin 22 and has screwed onto it an eye member 23 having a body portion similar to 8. The rod or pin 22 likewise has screwed onto it an eye member 24 likewise having a body portion similar to 8.

Between the body portions of all the eye members 7, 17, 23 and 24 and the previously coated wood portion 5, I preferably provide ferrules 25 which are pressed snugly into the rubber coating forming water tight seals and seats for gaskets 26 to prevent water from entering the hollow portions of the wooden body 5.

Referring particularly to Figure 4, a coating of rubber 29 previously described lies adjacent the wood, not only externally of the body, but also within the holes as shown particularly at 27. Externally of the rubber coating are the several coats of enamel described below and particularly the coat 28 of enamel containing luminous powder.

This invention contemplates the use of a coating of rubber between the wood and the enamel. The rubber is applied to the wood by a dipping process which permits the rubber to penetrate all of the holes in the wood which have been drilled for the purpose of the attachment to the lure of hooks, draw eyes, spinners and the like. The penetration of the rubber coating into all of the holes and its complete envelopment of the exterior of the lure completely seals the wood of the lure against infiltration of water when the lure is submerged, thus preventing or tending to prevent one of the conditions which causes the cracking of ordinary enamels, i. e., the expansion of the wood of the lure from moisture.

Any known rubber or latex paint may be used, such as that described in United States Letters Patent to Coolidge et al., No. 1,863,834 of June 21, 1932. The coating of rubber should be from $\frac{1}{64}$ to $\frac{1}{32}$ of an inch in thickness. It should be of substantially the same permanent elasticity as that of a fresh elastic band.

I have found that white flat nitro cellulose enamel or lacquer of the type manufactured and sold by the Egyptian Lacquer Manufacturing Company of Chicago, Illinois, under its trade No. 415 adheres firmly to the rubber base and forms a coating 30 (see Fig. 4) which remains continuously sufficiently elastic to resist cracking or checking when applied over a rubber base as herein described. I have found it preferable to apply two coats of this enamel with sufficient intervening time for the surface of the first coat to harden. Next I preferably apply two coats of luminous material 28 formed by mixing any form of luminous powder into clear nitro cellulose lacquer. A lacquer satisfactory for this purpose is supplied by the Egyptian Lacquer Manufacturing Company of Chicago under its trade No. 144. After the luminous coats have been allowed to dry, a design of fish scales or any suitable markings 31 should be applied by means of a rubber stamp using any form of quick drying printer's ink. On top of this design I preferably apply two or more coats of elastic nitro cellulose water proof varnish 32.

The rubber coating or cushion which lies between the wood body and the enamel coats allows not only a greater degree of contraction and expansion of the enamel coats with respect to the wood body and vice versa, but also permits of a certain small degree of movement of the enamel coating with respect to the wood body through temporary distortion of the rubber coating, thus more nearly equalizing the stresses throughout the whole of the enamel coatings, preventing checks and cracks, but even if, through extreme temperature changes, cracks do occur in the enamel, such cracks will not permit water to be soaked up by the soft wood because the rubber does not crack and consequently forms a continuous water proof envelope about the wood.

This invention is particularly applicable to lures which are provided with light-absorbing luminous coatings because, in order that such coatings will emanate light when cast into deep water or when used at night, they must be exposed either to sunlight or to artificial light at intervals. Such sunlight or artificial light, whichever is used for supplying the light energy, creates heat and enamel strains not necessarily created in fish lures coated with ordinary non-luminous enamels.

Although I have shown and described my invention in connection with wood bodied fish lures, it is to be understood that some of its features are applicable to fish lures or artificial baits made of metal or other non-moisture-absorbing materials, that is, the cushioning effect of the rubber and its action in permitting slight movement between the enamel and the body which occurs when uneven expansion and contraction take place, is an advantage no matter what the material of the body may be. It is therefore to be understood that my invention is not to be limited strictly to the particular structure shown and described, many modifications being possible within the scope of my invention.

I claim:

1. A fish lure comprising a porous body having openings therein, a coating of rubber or latex over the entire outside of the body and the walls of the openings therein, and an enamel coating on the outside of that part of the rubber which surrounds the lure.

2. A luminous fish lure comprising a body portion externally coated with rubber or latex and a coating exterior of the rubber containing a light-absorbing material which gives off its absorbed light in the darkness, the rubber forming an elastic cushion for preventing the cracking of the light-absorbing coating when the latter is heated and again quickly chilled in bringing about the rapid absorption of light immediately followed by the plunging of the lure into cold water, and an opaque coating between the rubber or latex and the light absorbing material to protect the rubber or latex against deterioration.

3. A fish lure comprising a wooden body portion, a rod extending across the body portion, a hook attached to one end of the rod, a second rod having an eye at one end which surrounds the first rod, and a draw eye attached to the forward end of the second rod.

4. A fish lure comprising a wooden body portion, a plurality of substantially parallel headed rods extending across the body of the lure, hooks attached to the ends of the rods opposite the heads, other rods within the body portion of the lure extending at angles to the first rods, each of the latter rods having an eye at its inner end surrounding an associated first rod, a hook attached to one of said second rods, and a draw eye attached to another of said second rods, the holes in the body of the lure through which said rods extend having their walls coated with rubber to prevent the penetration of liquid into the wood of the lure if and when such liquid finds its way into the space in said holes which surrounds the rods therein.

5. A fish lure comprising a body portion of wood, a coating of nitro cellulose enamel externally of the wood, a coating of enamel containing luminous powder externally of the said nitro cellulose enamel coating, an over printing of an opaque design on the luminous coating, and an external coating of clear elastic nitro cellulose varnish externally of the luminous coating and opaque design.

6. A fish lure comprising a wooden body portion, a coating of rubber or latex on said body portion to seal the wood against entrance of water and to form a resilient paint base, an opaque coating over said rubber or latex to prevent deterioration of the rubber or latex from the effect of light incident thereon, a luminous coating on the outside of said opaque coating, a design made up of opaque portions printed over said luminous coating, and a transparent coating covering the luminous coating and the opaque design.

7. A fish lure comprising a wooden body portion having holes and recesses therein, a coating of rubber or latex covering the surface of said body portion including the surfaces of the holes and recesses to seal the wood against entrance of moisture and to form a resilient paint base, an opaque coating over said rubber or latex to prevent deterioration of the rubber or latex from the effect of light incident thereon, a luminous coating on the outside of said opaque coating, a design made up of opaque portions printed over said luminous coating, and a transparent coating covering the luminous coating and the opaque design, said composite coating being applied so that only the latex or rubber coating covers all of the surfaces of said lure.

MARION R. FERRIS.